United States Patent [19]

Patel

[11] Patent Number: 5,032,296

[45] Date of Patent: Jul. 16, 1991

[54] WELL TREATING FLUIDS AND ADDITIVES THEREFOR

[75] Inventor: Bharat Patel, Bartlesville, Okla.

[73] Assignee: Phillips Petroleum Company, Bartlesville, Okla.

[21] Appl. No.: 280,303

[22] Filed: Dec. 5, 1988

[51] Int. Cl.$^5$ .......................... C09K 7/02; E21B 33/14
[52] U.S. Cl. ............................. 252/8.551; 252/8.552; 252/8.554; 252/8.51; 252/8.511; 252/8.512; 523/130
[58] Field of Search .............. 252/8.551, 8.554, 8.552, 252/8.51, 8.512, 8.511; 523/130

[56] References Cited

U.S. PATENT DOCUMENTS

| | | | |
|---|---|---|---|
| 3,245,469 | 4/1966 | Bertness | 166/39 |
| 3,629,101 | 12/1971 | Hille et al. | 252/8.51 |
| 3,733,833 | 5/1973 | Parks et al. | 405/264 |
| 3,766,984 | 10/1973 | Nimerick | 166/294 |
| 3,948,783 | 4/1976 | Szabo et al. | 252/8.551 |
| 4,048,077 | 9/1977 | Engelhardt et al. | 252/8.51 |
| 4,147,681 | 4/1979 | Lim et al. | 524/813 |
| 4,240,505 | 12/1980 | Swanson | 166/302 |
| 4,304,300 | 12/1981 | Watson | 166/291 X |
| 4,502,965 | 3/1985 | Giddings et al. | 252/8.51 |
| 4,540,498 | 9/1985 | Wu et al. | 252/8.551 |
| 4,579,927 | 4/1986 | Patel et al. | 527/400 |
| 4,602,685 | 7/1986 | McKenzie et al. | 166/293 |
| 4,632,185 | 12/1986 | Moradi-Araghi et al. | 166/273 X |
| 4,637,882 | 1/1987 | Peiffer | 252/8.514 |
| 4,644,020 | 2/1987 | Stahl | 522/79 |
| 4,652,606 | 3/1987 | Slingerland | 525/54.2 |
| 4,671,883 | 6/1987 | Connell et al. | 252/8.515 |
| 4,674,574 | 6/1987 | Savoly et al. | 166/293 |
| 4,676,317 | 6/1987 | Fry et al. | 166/293 |
| 4,699,225 | 10/1987 | Bardoliwalla | 252/8.514 |
| 4,737,295 | 4/1988 | Cowan et al. | 252/8.515 |
| 4,741,843 | 5/1988 | Garvey et al. | 252/8.514 |
| 4,743,383 | 5/1988 | Stewart et al. | 252/8.51 |
| 4,749,498 | 6/1988 | Lange et al. | 252/8.514 |
| 4,764,574 | 8/1988 | Clark, Jr. | 526/207 |
| 4,826,611 | 5/1989 | Blair | 252/8.51 |

OTHER PUBLICATIONS

'The Illustrated Petroleum Reference Dictionary', Second Edition, edited by Robert D. Layenkamp, p. 208.

*Primary Examiner*—John S. Maples
*Assistant Examiner*—Chhaya Sayala
*Attorney, Agent, or Firm*—Laney, Dougherty, Hessin & Beavers

[57] ABSTRACT

An additive for reducing the water loss and improving other properties of well treating fluids in high temperature subterranean environments and well treating fluids including the additive are provided. The additive comprises a mixture of a water soluble polymer and an organic compound, the water soluble polymer being comprised of N-vinyl lactam monomers, or vinyl-containing sulfonate monomers, or both. The organic compound can be selected from lignites, tannins, asphaltic materials, derivatives thereof and mixtures of such dispersants.

4 Claims, No Drawings

WELL TREATING FLUIDS AND ADDITIVES THEREFOR

BACKGROUND OF THE INVENTION

1. Field Of The Invention

The present invention relates generally to well treating fluids and additives therefor, and more particularly, to additives for reducing the water loss and improving other properties of drilling fluids, stimulation fluids, cement slurries and the like.

2. Description Of The Prior Art

A great variety of aqueous treating fluids are utilized in the drilling, completion, stimulation and workover of oil and gas wells. Examples of such fluids are aqueous drilling fluids which generally contain clays and clayey materials such as bentonite; aqueous completion and stimulation fluids which contain hydratable gelling agents such as galactomannan gums, cellulose derivatives and various polymers; and aqueous completion fluids containing cement, i.e., cement slurries. In the use of all of such fluids, particularly in the hostile high temperature subterranean environments to which the fluids are subjected in deep wells, problems are encountered which involve the loss of water from the fluids to surrounding formations and/or undesirable increases or decreases in viscosity and other rheological properties of the fluids.

In the drilling of well bores, the aqueous drilling fluids are normally comprised of water, various types of finely divided clays and weighting materials, all suspended in the water. The drilling fluid functions to remove cuttings from the well bore as it is being drilled; to prevent excessive amounts of water from flowing from the well bore into surrounding formations by depositing substantially water impervious filter cake on the walls of the well bore; to hold the cuttings and solids in suspension; and to exert sufficient pressure in the well bore to prevent pressurized fluids contained in penetrated subterranean formations from intruding into the well bore.

When certain subterranean formations such as gypsum are encountered, the viscosity of the drilling fluid can become too high due to flocculation of the clay particles therein. In deeper wells, the high temperature environment encountered by the drilling fluid can cause excessive water loss and increased viscosity to occur. When the viscosity of the drilling fluid reaches too high a level for whatever cause, pump pressures required for circulating the drilling fluid greatly increase and circulation may be slowed or stopped. The same or similar types of problems can be encountered in the use of aqueous stimulation fluids, aqueous cement slurries, and other well treating fluids when high temperature subterranean formations are encountered.

In order to control water loss and prevent changes in viscosity and other rheological properties of aqueous well treating fluids, a variety of additives have heretofore been included therein. Additives for reducing water loss have included various natural and synthetic polymers which act as colloidal agents. The yield point, gel strength, and in turn, the apparent viscosity of well treating fluids, have heretofore commonly been controlled by including organic additives which function as dispersants in the well treating fluid such as complex phosphates, alkalies, lignites, tannins, lignosulfonates, asphalts, etc.

Lignites and lignite derivatives are particularly effective in controlling viscosity and other rheological properties of well treating fluids subjected to high temperatures. Plant tannins such as quebracho and sulfomethylated quebracho are effective dispersants in contaminated drilling fluids and other well treating fluids at high temperatures. Other dispersants which have been utilized heretofore include sulfonated asphalts, lignosulfonates and similar organic materials.

While, as mentioned, many additives for reducing water loss and improving the rheological properties of well treating fluids have been developed and used heretofore, such additives have generally been expensive and/or have high toxicity whereby their use involves disposal problems in many areas. Thus, there is a continuous demand for more effective and economical additives having low toxicity.

SUMMARY OF THE INVENTION

An additive for reducing the water loss and improving other properties of aqueous well treating fluids such as drilling fluids, stimulation fluids and cement slurries in high temperature subterranean environments is provided. The additive is basically comprised of a mixture of a water soluble polymer and an organic compound, the water soluble polymer being comprised of N-vinyl lactam monomers or vinyl-containing sulfonate monomers, or both. The organic compound is selected from the group consisting of lignites, tannins, asphalts including gilsonite, derivatives thereof and mixtures of such compounds. In a particularly preferred embodiment, the water soluble polymer is a copolymer of N-vinyl pyrrolidone and the sodium salt of 2-acrylamido-2-methylpropane sulfonic acid, and the organic compound is a lignite, e.g., leonardite.

A particularly effective dry solid additive of this invention is prepared by mixing a water and oil emulsion containing the polymer with the organic compound followed by the removal of the oil and water from the resulting mixture.

Well treating fluids of the invention are comprised of water, a fluid thickening component such as one or more inorganic clays, a gelling agent or cement, and the above-described additive for reducing the water loss and improving other properties of the well treating fluid in high temperature subterranean environments.

It is, therefore, a general object of the present invention to provide improved well treating fluids and additives therefor.

A further object of the present invention is the provision of an additive for reducing the water loss and improving other properties of well treating fluids which are subjected to high temperature subterranean environments.

Another object of the present invention is the provision of an additive of the type described which is relatively inexpensive and has a relatively low toxicity whereby the use and disposal of well treating fluids including the additive are not inhibited.

Other and further objects, features and advantages of the well treating fluids and additives of the present invention will be readily apparent to those skilled in the art upon a reading of the description of preferred embodiments which follows.

DESCRIPTION OF PREFERRED EMBODIMENTS

The additive of the present invention for use in aqueous well treating fluids is comprised of a mixture of a water soluble polymer and an organic compound. The water soluble polymer is comprised of N-vinyl lactam monomers or vinyl-containing sulfonate monomers, or both. The N-vinyl lactam monomers can be represented by the formula:

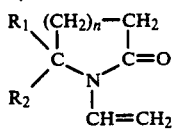

wherein $R_1$ and $R_2$ are selected independently from hydrogen, a methyl group or an ethyl group, and n is an integer of from 1 to 3. These monomers are generally water-soluble or water-dispersible. More preferred monomers are those of the formula:

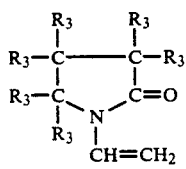

wherein $R_3$ is hydrogen, or methyl or ethyl groups. The most preferred N-vinyl lactam monomer for use in accordance with the present invention is N-vinyl-2-pyrrolidone, i.e., a monomer wherein $R_3$ in the above formula is hydrogen.

The vinyl-containing sulfonate monomers can be represented by the formula:

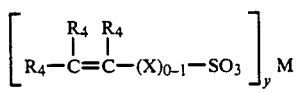

wherein $R_4$ is hydrogen, or methyl or ethyl groups, preferably hydrogen or methyl groups, and provided further that at least one of the $R_4$ groups on the terminal carbon of the vinyl group is hydrogen; M is hydrogen, sodium, potassium, lithium, calcium or magnesium; y is an integer equal to the valence of M; and X is

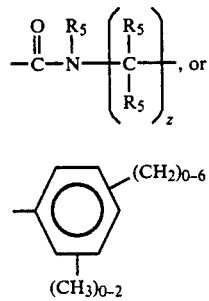

wherein z is an integer of 1 through 5, preferably 1 through 3, and $R_5$ is hydrogen or alkyl groups containing 1 through 3 carbon atoms.

Examples of such monomers are the sodium salt of vinyl sulfonic acid, the sodium salt of 2-acrylamido-2methylpropane sulfonic acid, the sodium salt of styrene sulfonic acid, the sodium salt of vinyl toluene sulfonic acid, and the sodium salt of p-vinylbenzyl sulfonic acid. The most preferred vinyl-containing sulfonate for use in accordance with the present invention is the sodium salt of 2-acrylamido-2-methylpropane sulfonic acid.

The above-described monomers are commercially available and are produced as known in the art.

Polymers comprised of either of the monomers described above or copolymers comprised of both monomers can be produced utilizing oil-in-water emulsion polymerization techniques which are also known in the art. A preferred method of producing the polymers is the inverse emulsion polymerization method, i.e., the water-in-oil emulsion method described in U.S. Pat. No. 4,764,574 issued Aug. 16, 1988 and assigned to the assignee of this present invention, which is incorporated herein by reference.

The organic compound utilized can be selected from lignites, tannins, asphalts and other similar materials, derivatives of the materials, and mixtures of such organic compounds. While any suitable lignite or lignite byproduct can be used, lignitic materials which are high in humic acids, and thus soluble in basic aqueous solutions, are preferred. Also, lignites sulfonated or sulfoalkylated using methods known to those skilled in the art to improve their solubility can be used. Leonardite, a soft, earthy coal-like substance mined commercially in the United States is particularly suitable. Leonardite is characterized by its high oxygen and humic acid contents and increased alkali solubility. Normal lignite may be converted to a material of similar properties to leonardite by oxidation. Of the various organic compounds which can be used in accordance with the present invention, lignitic materials of the type described above are preferred.

Tannins which can be used include both the vegetable gallotannins and the vegetable flavotannins. Examples of gallotannins include tannic acid, tea tannin, oak tannin and chestnut tannin. Examples of flavotannins include quebracho, wattle, mangrove, spruce, hemlock, etc. Tannins can also be sulfonated or sulfoalkylated by methods known to those skilled in the art.

Asphaltic materials such as gilsonite and their derivatives can also be utilized.

The water and oil emulsion, i.e., the oil-in-water or water-in-oil emulsion depending upon the polymerization method used, containing the polymer or copolymer described above can be processed to remove the water and oil. The resulting solid water soluble polymer can be mixed directly with the solid organic compound utilized to produce a solid additive of the present invention. If a liquid additive is desired, the solid organic compound utilized can be mixed with the water and oil emulsion containing the polymer, and the removal of the water and oil can be omitted. Most preferably, a solid additive of the present invention is produced by first mixing the solid organic compound utilized with the water and oil emulsion containing the polymer followed by the removal of the water and oil from the mixture. The resultant dry solid mixture is a particularly effective additive of the present invention.

A preferred additive of the present invention is a water soluble copolymer of N-vinyl pyrrolidone and the sodium salt of 2-acrylamido-2-methylpropane sulfonic acid mixed with an organic compound comprised of a lignite or lignite byproduct. The additive is preferably formed by mixing a water and oil emulsion containing the polymer with the lignitic organic compound followed by the removal of the water and oil utilizing conventional evaporation or other techniques. The resulting dry solid additive is particularly suitable and effective for use in applications involving high temperature environments.

The water soluble polymer and organic compound are preferably present in the additive mixture in a weight ratio in the range of from about 30:70 to about 95:5. When the additive is a liquid as a result of including the water and oil emulsion, the emulsion and polymer contained therein are preferably present in the mixture in a weight ratio in the range of from about 25:75 to about 90:10. Further, in such a liquid additive, the emulsion (with polymer) and the organic compound utilized are preferably present in the additive in a weight ratio in the range of from about 50:50 to about 95:5.

The most preferred additive of the present invention is comprised of a copolymer of N-vinyl pyrrolidone and the sodium salt of 2-acrylamido-2-methylpropane sulfonic acid in a weight ratio in the range of about 10:90 mixed with an organic dispersant comprised of leonardite, the mixture being prepared by mixing a water and oil emulsion containing the copolymer with the leonardite followed by the removal of the oil and water from the mixture. The dry solid mixture preferably contains copolymer and leonardite in a weight ratio of about 40:50.

A well treating fluid of the present invention is comprised of water, at least one fluid thickening component and an additive of the present invention for reducing the water loss and improving other properties of the well treating fluid in high temperature subterranean environments. The water utilized in forming the well treating fluid can be fresh water or salt water including oilfield brines and seawater. The fluid thickening component can be any of the various components used in drilling fluids, completion fluids, stimulation fluids and the like. Generally, such components include inorganic clays and clayey materials utilized in drilling fluids, gelling agents such as galactomannan gums, cellulose derivatives and synthetic polymers and cements. In addition to the foregoing, the well treating fluids can include a variety of other components and additives commonly utilized to achieve desired results.

The above-described additive of this invention is included in the well treating fluid in an amount in the range of from about 0.05% by weight to about 6% by weight of the fluid. As mentioned, the additive functions to reduce water loss and to improve other rheological properties of the well treating fluid. For example, the additive functions to reduce the apparent viscosity of a well treating fluid, e.g., a drilling fluid, by reducing the plastic viscosity, the yield point, and the rate and degree of gelation of the fluid. Plastic viscosity is a property related to the concentration of solids in the fluid, whereas yield point is a property related to the interparticle forces. Gel strength is a property that denotes the thixotropy of the fluid at rest.

In order to further illustrate the well treating fluids and additives of the present invention, the following examples are given.

EXAMPLE 1

Additives of the present invention were prepared by mixing with various organic compounds, various quantities of a copolymer of N-vinyl pyrrolidone and the sodium salt of 2-acrylamido-2-methylpropane sulfonic acid. The copolymer was produced in an inverse water-in-oil emulsion in accordance with the polymerization process described in the aforementioned U.S. Pat. No. 4,764,574 issued Aug. 16, 1988. The emulsion containing the copolymer was comprised of about 110 parts by weight water per 100 parts by weight of copolymer and about 80-100 parts by weight hydrocarbon per 100 parts by weight copolymer. The hydrocarbon which was used is sold under the trademark "SOLTROL® 145" by Phillips Petroleum Company. The copolymer had a weight ratio of N-vinyl pyrrolidone to the sodium salt of 2-acrylamido-2-methylpropane sulfonic acid of 10:90.

The organic compounds utilized, i.e., lignite, causticized lignite, sulfomethylated quebracho and sulfonated asphalt, were each mixed in the dry state with portions of the liquid emulsion containing polymer in the amounts given in Table I below using an electric mixer. Additional quantities of SOLTROL® 145 hydrocarbon were added where necessary during the addition of dry material in order to maintain the mixtures stirrable. After mixing for at least 5 minutes, the water and oil contained in the mixtures were removed by drying at a temperature of about 275° F. After drying the resulting solids were particulated by grinding. In addition, additives comprised of liquid polymer emulsion and lignite, dried polymer and lignite formed by drying the polymer emulsion at a temperature of 275° F. and then mixing it with lignite, dried polymer emulsion alone (dried at 275° F.) and liquid polymer emulsion alone ere prepared. The additives and the quantities of components utilized (except for the dried polymer emulsion alone and liquid polymer emulsion alone) are given in Table I below.

TABLE I

| Additive No. | Organic Compound Used | Weight Ratio of Polymer Emulsion to Organic Compound | Quantity of Polymer Emulsion Used, grams | Quantity of Organic compound Used, grams | Quantity of Additional SOLTROL® 145 Added | Weight Ratio of Dry Polymer to Organic Compound[3] |
|---|---|---|---|---|---|---|
| 1 | Lignite[1] | 3:1 | 75 | 25 | — | — |
| 2 | Lignite[1] | 2:1 | 35 | 17.5 | — | — |
| 3 | Lignite[1] | 1:1 | 25 | 25 | 15 | — |
| 4 | Causticized Lignite[2] | 2:1 | 35 | 17.5 | — | — |
| 5 | Sulfonated Asphalt[5] | 2:1 | 50 | 25 | 15 | — |
| 6 | Sulfomethylated Queracho | 2:1 | 50 | 25 | — | — |
| 7 | Dry Polymer-Lignite[1] | — | — | — | — | 1.5:2.25 |

TABLE I-continued

| Additive No. | Organic Compound Used | Weight Ratio of Polymer Emulsion to Organic Compound | Quantity of Polymer Emulsion Used, grams | Quantity of Organic compound Used, grams | Quantity of Additional SOLTROL® 145 Added | Weight Ratio of Dry Polymer to Organic Compound[3] |
|---|---|---|---|---|---|---|
| 8 | Mixture[3] Dry Polymer-Ligite[1] Mixture[3] | — | — | — | — | 1.5:3.5 |
| 9 | Liquid Polymer Emulsion-Lignite[1, 4] | 2:1 | — | — | — | — |

[1]Leonardite from North Dakota
[2]Leonardite treated with NaOH
[3]Dry polymer formed first by drying the polymer emulsion at 275° F. after which the lignite was mixed therewith.
[4]Liquid polymer emulsion and lignite were added separately to muds described below.
[5]Marketed under the trade name "SOLTEX" by Drilling Specialties Co. of Bartlesville, Oklahoma.

EXAMPLE 2

A number of the additives of Table I were combined with portions of fresh water mud in the amounts given in Table II below, stirred for 20 minutes in an electric mixer and then hot rolled for 16 hours at 175° F. After cooling to room temperature, the resulting test samples were stirred for 2 minutes and then tested to determine rheological properties, room temperature water loss and pH. The fresh water mud utilized was comprised of deionized water containing the equivalent of 10 pounds per barrel bentonite clay and 20 pounds per barrel of solids comprised principally of Ca-Montmorillonite and aluminum silicate marketed under the trade name "REV-DUST" by The Milwhite Co. of Houston, Tex. to simulate suspended drilling solids.

TABLE II

| Component | Mud and Additive Sample | | | | | | | |
|---|---|---|---|---|---|---|---|---|
| | 1 | 2 | 3 | 4 | 5 | 6 | 7 | 8 |
| Base Mud, ml. | 280 | 280 | 280 | 280 | 280 | 280 | 280 | 280 |
| Additive No. 1, grams | — | — | — | 3.0 | — | — | — | — |
| Additive No. 2, grams | — | — | — | — | 3.75 | — | — | — |
| Additive No. 3, grams | — | — | — | — | — | 6.0 | — | — |
| Additive No. 4, grams | — | — | — | — | — | — | 3.75 | — |
| Additive No. 6, grams | — | — | — | — | — | — | — | 3.75 |
| Additive No. 7, grams | — | 3.75 | — | — | — | — | — | — |
| Additive No. 8, grams | — | — | 5.0 | — | — | — | — | — |
| Dry Polymer Alone | 1.5 | — | — | — | — | — | — | — |

The rehological tests were carried out using a FANN Model 35 VG meter to determine plastic viscosity, yield point and gel strength. Such tests, and a water loss test at room temperature were made in accordance with API RP 13B. The apparent viscosity was determined at 600 rpm with the FANN Model 35 VG meter assuming Newtonian flow. The pH values of the mud samples were also determined. The results of these tests are given in Table III below.

TABLE III

| Property Tested | Mud and Additive Sample | | | | | | | |
|---|---|---|---|---|---|---|---|---|
| | 1 | 2 | 3 | 4 | 5 | 6 | 7 | 8 |
| Apparent Viscosity, cp | 26 | 24.5 | 25 | 37 | 37.5 | 37 | 29 | 24 |
| Plastic Viscosity, cp | 21 | 19 | 20 | 27 | 28 | 27 | 23 | 20 |
| Yield Point, lb./100 sq. ft. | 10 | 11 | 10 | 20 | 19 | 20 | 12 | 8 |
| Gel Strength 10 sec./10 min. (lb./100 sq. ft.) | 3/3 | 3/3 | 3/3 | 3/3 | 4/5 | 4/5 | 3/3 | 3/3 |
| Room Temperature Water Loss, ml./30 min. | 10 | 15.4 | 11.8 | 7.6 | 6.4 | 12.6 | 7.4 | 6.9 |
| pH | 7.3 | 4.6 | 5.3 | 5.3 | 5.0 | 4.3 | 7.2 | 6.7 |

As shown by Tables II and III above, the additives of the present invention reduce water loss more than the dry polymer alone.

EXAMPLE 3

A number of the additives of Table I were combined with the fresh water mud described in Example 2 above except that the pH of the fresh water mud was adjusted to 9.5 by combining sodium hydroxide solution (1 milliliter contains 0.5 gram NaOH) therewith. In addition, mud samples were prepared containing dry polymer alone and polymer emulsion alone. The quantities of components in the various mud samples are given in Table IV below.

TABLE IV

| Component | Mud and Additive Sample | | | | | | | |
|---|---|---|---|---|---|---|---|---|
| | 1 | 2 | 3 | 4 | 5 | 6 | 7 | 8 |
| Base Mud, ml. | 280 | 280 | 280 | 280 | 280 | 280 | 280 | 280 |
| Additive No. 1, grams | — | — | — | — | 3.0 | — | — | — |
| Additive No. 2, grams | — | — | — | — | — | 3.75 | — | — |
| Additive No. 3, grams | — | — | — | — | — | — | 6.0 | — |
| Additive No. 4, grams | — | — | — | — | — | — | — | 3.75 |
| Additive No. 7, grams | — | 3.75 | — | — | — | — | — | — |
| Additive No. 9, grams | — | — | — | 6.80 | — | — | — | — |
| Dry Polymer Alone, grams | 1.5 | — | — | — | — | — | — | — |
| Polymer Emulsion Alone, grams | — | — | 4.55 | — | — | — | — | — |

The mud samples shown in Table IV were tested for rheological properties, water loss and pH after being hot rolled for 16 hours at 175° F. in the same manner as described in Example 2 above. The results of these tests are given in Table V below.

TABLE V

| Property Tested | Mud and Additive Sample | | | | | | | |
|---|---|---|---|---|---|---|---|---|
| | 1 | 2 | 3 | 4 | 5 | 6 | 7 | 8 |
| Apparent Viscosity, cp | 19 | 14 | 47 | 31.5 | 27 | 28.5 | 16 | 29.5 |
| Plastic Viscosity, cp | 16 | 13 | 30 | 24 | 22 | 23 | 15 | 23 |
| Yield Point, lb./100 sq. ft. | 6 | 2 | 34 | 15 | 10 | 11 | 2 | 13 |
| Gel Strength 10 sec./10 min. (lb./100 sq. ft.) | 2/2 | 2/2 | 5/6 | ½ | 3/3 | 3/3 | 2/2 | ½ |
| Room Temperature Water Loss, ml./30 min. | 10.6 | 9.0 | 7.2 | 6.2 | 7.2 | 6.8 | 6.6 | 6.4 |
| pH | 8.2 | 7.5 | 8.2 | 7.9 | 8.0 | 7.6 | 7.2 | 8.0 |

Because of the alkalinity of the base mud utilized, the lignite was dissolved, and the additives of the present invention were generally more effective in reducing water loss than dry polymer alone and polymer emulsion alone.

EXAMPLE 4

Samples of synthetic seawater mud were prepared by mixing 290 milliliters of fresh water with 10 grams of bentonite clay, 12.5 grams of sea salt, 20 grams of REV-DUST and 200 grams of Barite (barium sulfate). Additives comprised of polymer emulsion alone and an additive of the present invention (Additive No. 2 of Table I) were combined with the synthetic seawater mud samples. The pH of the synthetic seawater mud samples was adjusted with sodium hydroxide to about 9.1.

The samples including additive were tested for rheological properties immediately after their preparation and then again after aging for 16 hours at 400° F. The results of these tests are given in Table VI below.

TABLE VI

| | Mud and Additive Sample | | |
|---|---|---|---|
| | 1 | 2 | 3 |
| Additive | | | |
| Polymer Emulsion alone, grams | 10.8 | — | — |
| Additive No. 2, grams | — | 9.0 | 7.0 |
| Initial Rheology | | | |
| Apparent Viscosity, cp | 55 | 55 | 43 |
| Plastic Viscosity, cp | 41 | 42 | 37 |
| Yield Point, lb./100 sq. ft. | 28 | 26 | 12 |
| Gel Strength, 10 sec./10 min. (lb./100 sq. ft.) | 10/23 | 3/10 | 3/10 |
| Room Temperature Water Loss, ml./30 min. | 6.2 | 4.5 | 6.6 |
| Rheology After Aging | | | |
| Apparent Viscosity, cp | 22 | 48 | 36 |
| Plastic Viscosity, cp | 21 | 42 | 32 |
| Yield Point, lb./100 sq. ft. | 1 | 11 | 7 |
| Gel Strength, 10 sec./10 min. (lb./100 sq. ft.) | ½ | 3/3 | 3/3 |
| Room Temperature Water Loss, ml./30 min. | 20.8 | 5.4 | 7.2 |

From Table VI, it can be seen that the additive of the present invention (Additive No. 2—Table I) gave comparable results to the polymer emulsion alone in the initial rheology tests. After aging 16 hours at 400° F., the additive of the present invention was the most effective in lowering water loss and maintaining rheological properties.

EXAMPLE 5

Samples of saturated sodium chloride water mud were prepared by combining with 240 milliliters of fresh water, 6 grams of bentonite, 85 grams of sodium chloride, 20 grams of REV-DUST, 200 grams of Barite (barium sulfate) and 2.5 milliliters (1 milliliter contains 0.5 gram NaOH) of sodium hydroxide. Polymer emulsion alone and additives of the present invention (Additive No. 2 and Additive No. 9—Table I) were combined with separate portions of the mud. The resulting mud and additive samples were initially tested for water loss and rheology, and then tested again after being hot rolled for 2 hours at 300° F. and aged for 15 hours at 400° F. The results of these tests are given in Table VII below.

TABLE VII

| | Mud and Additive Sample | | |
|---|---|---|---|
| | 1 | 2 | 3 |
| Additive | | | |
| Polymer Emulsion alone, grams | 10 | — | — |
| Additive No. 9, grams | — | 15 | — |
| Additive No. 2, grams | — | — | 8.25 |
| Initial Rheology | | | |
| Apparent Viscosity, cp | 57 | 36 | 36 |
| Plastic Viscosity, cp | 46 | 33 | 34 |
| Yield Point, lb./100 sq. ft. | 22 | 5 | 4 |
| Gel Strength, 10 sec./10 min. (lb./100 sq. ft.) | 5/9 | 2/2 | 2/2 |
| Room Temperature Water Loss, ml./30 min. | 5.9 | 5.4 | 7.4 |
| Rheology After Aging | | | |
| Apparent Viscosity, cp | 38 | 40 | 42 |
| Plastic Viscosity, cp | 32 | 38 | 40 |
| Yield Point, lb./100 sq. ft. | 11 | 4 | 4 |
| Gel Strength, 10 sec./10 min. (lb./100 sq. ft.) | 4/10 | 2/2 | ½ |
| Room Temperature Water Loss, ml./30 min. | 48.3 | 9.2 | 13.8 |

As shown in Table VII, the additives of the present invention were generally more effective in both reducing water loss and maintaining rheology than the polymer emulsion alone.

EXAMPLE 6

Samples of hard brine mud were prepared by combining with 325 milliliters of hard brine, 6 grams of Attapulgite, 20 grams of bentonite and 50 grams of Barite (barium sulfate). Additives comprised of polymer emulsion and an additive of the present invention (Additive No. 2—Table I) were combined with the hard brine mud samples.

The resulting mud and additive samples were tested for initial water loss and rheology as well as water loss and rheology after aging 16 hours at 300° F. The results of these tests are set forth in Table VIII below.

TABLE VIII

| | Mud and Additive Sample | | | | |
|---|---|---|---|---|---|
| | 1 | 2 | 3 | 4 | 5 |
| Additive | | | | | |
| Polymer Emulsion alone, grams | — | 8 | 10 | — | 10 |
| Additive No. 2, grams | — | — | — | 8 | — |
| Causticized Lignite, grams | 15 | 15 | 15 | 15 | — |
| Initial Rheology | | | | | |

TABLE VIII-continued

| | Mud and Additive Sample | | | | |
|---|---|---|---|---|---|
| | 1 | 2 | 3 | 4 | 5 |
| Apparent Viscosity, cp | 8 | 36 | 36 | 33 | 35 |
| Plastic Viscosity, cp | 8 | 28 | 26 | 25 | 26 |
| Yield Point, lb./100 sq. ft. | 0 | 16 | 20 | 16 | 18 |
| Gel Strength, 10 sec./10 min. (lb./100 sq. ft.) | 1/3 | 6/10 | 5/11 | 6/12 | 4/7 |
| Room Temperature Water Loss, ml./30 min. | 126.5 | 7 | 4 | 5.4 | 4.0 |
| *Rheology After Aging* | | | | | |
| Apparent Viscosity, cp | 8 | 16 | 34 | 26 | 22 |
| Plastic Viscosity, cp | 8 | 13 | 25 | 19 | 17 |
| Yield Point, lb./100 sq. ft. | 0 | 6 | 17 | 13 | 10 |
| Gel Strength, 10 sec./10 min. (lb./100 sq. ft.) | 2/5 | 4/5 | 5/10 | 5/10 | 5/7 |
| Room Temperature Water Loss, ml./30 min. | 134 | 43 | 6.5 | 13.5 | 19.4 |

From Table VIII it can be seen that the additives of the present invention are effective in hard brine mud. It is also evident from the results with samples 1, 3 and 5 that the addition of causticized lignite had a good effect on the mud properties. Viscosities, yield point and gel strength were increased and the water loss was reduced. Usually yield point and gel strength are reduced by the solubilized lignite.

EXAMPLE 7

Polymer emulsion alone in an amount equivalent to 10 pounds per barrel was combined with a generic mud comprised of 15 pounds per barrel of prehydrated bentonite, 50 pounds per barrel of REV-DUST, 1.5 pounds per barrel of NaOH, 4 pounds per barrel Q-Broxin (a drilling mud additive), 5 pounds per barrel of lignite, and 100 pounds per barrel of barite in synthetic seawater. The resulting mud and additive sample was tested in accordance with the Drilling Fluids Toxicity Test of the United States Environmental Protection Agency, Industrial Technology Division of the Office of Water, Washington, D.C. (40 C.F.R. Part 435, Aug. 26, 1985). The test requires an LC 50 of over 30,000 parts per million in many areas. The LC 50 of the above-described mud and additive sample was only 13,700 parts per million.

An additive of the present invention (Additive No. 2—Table I), was combined with a second sample of the generic mud described above in an amount equivalent to 10 pounds per barrel. The LC 50 of that mud and additive sample was 649,140 parts per million. Thus, the additive of the present invention is much less toxic and can be used in many areas where the polymer emulsion alone cannot be used.

Thus, the present invention is well adapted to carry out the objects and attain the ends and advantages mentioned as well as those inherent therein. While numerous changes in the quantities of components and other similar variables can be made by those skilled in the art, such changes are encompassed within the spirit of this invention as defined by the appended claims.

What is claimed is:

1. A solid, dry additive for reducing the water loss and improving other properties of well treating fluids in high temperature environments comprising a mixture of a water soluble copolymer of N-vinyl pyrrolidone and the sodium salt of 2-acrylamido-2-methylpropane sulfonic acid and an organic compound selected from the group consisting of lignites, tannins, asphaltic materials, derivatives thereof and mixtures of such compounds, said mixture of said water soluble copolymer and organic compound being prepared by mixing a water and oil emulsion containing said copolymer with said organic compound followed by removing the oil and water from the resultant mixture.

2. The additive of claim 1 wherein said copolymer consists essentially of N-vinyl pyrrolidone monomers and the sodium salt of 2-acrylamido-2-methylpropane sulfonic acid monomers in a weight ratio of about 10:90.

3. The additive of claim 2 wherein said organic compound is lignite or a derivative thereof.

4. The additive of claim 3 wherein said copolymer and said lignite are present in said mixture in a weight ratio of from about 10:90 to about 90:10.

* * * * *

UNITED STATES PATENT AND TRADEMARK OFFICE
CERTIFICATE OF CORRECTION

PATENT NO. : 5,032,296

DATED : July 16, 1991

INVENTOR(S) : Bharat Patel

It is certified that error appears in the above-identified patent and that said Letters Patent is hereby corrected as shown below:

Col. 6, line 48, change "ere" to --were--;

Col. 5, Table I, line 68, change "Queracho" to --Quebracho--;

Col. 7, Table I, line 8, change "Ligite" to --Lignite--; and

Col. 7, line 54, change "rehological" to --rheological--.

Signed and Sealed this

Twenty-second Day of December, 1992

Attest:

DOUGLAS B. COMER

*Attesting Officer*  *Acting Commissioner of Patents and Trademarks*